United States Patent
Mutoro et al.

(10) Patent No.: US 10,625,203 B2
(45) Date of Patent: Apr. 21, 2020

(54) MEMBRANE-ELECTRODE ASSEMBLY, REACTOR COMPRISING THE MEMBRANE-ELECTRODE ASSEMBLY AND PROCESS FOR SEPARATING OFF HYDROGEN

(71) Applicant: BASF SE, Ludwigshafen (DE)

(72) Inventors: Eva Mutoro, Ludwigshafen (DE); Gunter Bechtloff, Heuchelheim (DE); Sigmar Braeuninger, Hemsbach (DE); Bernd Bastian Schaack, Bensheim (DE)

(73) Assignee: BASF SE, Ludwigshafen (DE)

( * ) Notice: Subject to any disclaimer, the term of this patent is extended or adjusted under 35 U.S.C. 154(b) by 208 days.

(21) Appl. No.: 15/515,018

(22) PCT Filed: Sep. 15, 2015

(86) PCT No.: PCT/EP2015/071043
§ 371 (c)(1),
(2) Date: Mar. 28, 2017

(87) PCT Pub. No.: WO2016/050500
PCT Pub. Date: Apr. 7, 2016

(65) Prior Publication Data
US 2017/0204525 A1   Jul. 20, 2017

(30) Foreign Application Priority Data
Sep. 29, 2014   (EP) ..................... 14186807

(51) Int. Cl.
*B01D 53/32* (2006.01)
*C25B 1/02* (2006.01)
(Continued)

(52) U.S. Cl.
CPC .............. *B01D 53/326* (2013.01); *B01J 7/00* (2013.01); *C01B 3/24* (2013.01); *C01B 3/503* (2013.01);
(Continued)

(58) Field of Classification Search
CPC .................................................. B01D 53/326
See application file for complete search history.

(56) References Cited

U.S. PATENT DOCUMENTS

| | | |
|---|---|---|
| 2004/0028965 A1 | 2/2004 | McElroy et al. |
| 2006/0054512 A1 | 3/2006 | Ballantine et al. |

(Continued)

FOREIGN PATENT DOCUMENTS

| | | |
|---|---|---|
| EP | 2 417 084 A1 | 2/2012 |
| WO | WO 2007/025882 A1 | 3/2007 |

(Continued)

OTHER PUBLICATIONS

ELAT: https://www.fuelcellstore.conn/fuel-cell-components/gas-diffusion-layers/carbon-cloth/elat (Year: 2015).*

(Continued)

*Primary Examiner* — Nicholas A Smith
(74) *Attorney, Agent, or Firm* — Oblon, McClelland, Maier & Neustadt, L.L.P.

(57) ABSTRACT

Disclosed herein is a membrane-electrode assembly containing: a gastight, selectively proton-conducting membrane which has a retentate side having an anode and a permeate side having a cathode; a voltage source for generating a potential difference between the anode and the cathode; an anode catalyst having a catalytically active material on the retentate side; and a cathode catalyst having a catalytically active material on the permeate side, in which the cathode catalyst has a smaller amount of catalytically active material than the anode catalyst. The present disclosure also includes (Continued)

a reactor containing the membrane-electrode assembly, and a process for separating off hydrogen using the membrane-electrode assembly.

13 Claims, 6 Drawing Sheets

(51) Int. Cl.
*C01B 3/50* (2006.01)
*C25B 9/10* (2006.01)
*B01J 7/00* (2006.01)
*C01B 3/24* (2006.01)

(52) U.S. Cl.
CPC ............... *C25B 1/02* (2013.01); *C25B 9/10* (2013.01); *C01B 2203/0266* (2013.01); *C01B 2203/0405* (2013.01); *C01B 2203/048* (2013.01); *C01B 2203/0475* (2013.01)

(56) References Cited

U.S. PATENT DOCUMENTS

| | | | |
|---|---|---|---|
| 2008/0292921 A1 | 11/2008 | Lakshmanan et al. | |
| 2010/0132386 A1* | 6/2010 | Bahar | F25B 1/00 62/115 |
| 2011/0303550 A1* | 12/2011 | Coelho Tsou | C01B 3/26 205/462 |

FOREIGN PATENT DOCUMENTS

| | | |
|---|---|---|
| WO | WO 2007/096297 A1 | 8/2007 |
| WO | WO 2007/099028 A1 | 9/2007 |
| WO | WO 2010/115768 A1 | 10/2010 |
| WO | WO 2010/115786 A1 | 10/2010 |

OTHER PUBLICATIONS

U.S. Appl. No. 14/012,031, filed Aug. 28, 2013, US 2014-0065517 A1, Alexander Panchenko, et al.
U.S. Appl. No. 15/103,652, filed Jun. 10, 2016, US 2016-0304436 A1, Bernd Bastian Schaack, et al.
U.S. Appl. No. 14/473,191, filed Aug. 29, 2014, US 2015-0064599 A1, Sigmar Bräuninger, et al.
U.S. Appl. No. 14/759,522, filed Jul. 7, 2015, US 2015-0353446 A1, Mathias Feyen, et al.
U.S. Appl. No. 15/105,611, filed Jun. 17, 2016, US 2016-0310934 A1, Kristen Braunsmann, et al.
U.S. Appl. No. 15/103,789, filed Jun. 10, 2016, US 2016-0326094 A1, Andreas Weickgenannt, et al.
International Search Report dated Nov. 21, 2015 in PCT/JP2015/071043 (submitting English translation).
International Preliminary Report on Patentability dated Mar. 30, 2017 in PCT/EP2015/071043 filed Sep. 15, 2015 (submitting English translation).
S.A. Grigoriev, et al., "Pure Hydrogen Production by PEM Electrolysis for Hydrogen Energy" International Journal of Hydrogen Energy, ELSEVIER Science Publishers, vol. 31, No. 2, XP024899792, Feb. 1, 2006, pp. 171-175.
J W. Phair, et al., "Review of Proton Conductors for Hydrogen Separation" Ionics, International Journal of Ionics the Science and Technology of Ionics, vol. 12, No. 2, XP019416437, Jun. 15, 2006, pp. 103-115.

\* cited by examiner

MEMBRANE-ELECTRODE ASSEMBLY, REACTOR COMPRISING THE MEMBRANE-ELECTRODE ASSEMBLY AND PROCESS FOR SEPARATING OFF HYDROGEN

The present invention relates to a membrane-electrode assembly, a reactor which comprises the membrane-electrode assembly of the invention and also a process for separating off hydrogen using the membrane-electrode assembly of the invention.

The removal of hydrogen from mixed reaction gases is of great interest for various applications since any equilibrium reaction in which hydrogen is produced can be shifted to the product side when the hydrogen is removed. Various methods by means of which hydrogen can be separated off are therefore known from the prior art.

Thus, WO 2007/096 297 A1 describes, for example, a process in which the hydrogen formed is removed from the reaction mixture by oxidation on reducible metal oxides. However, this has the disadvantage that the reducible metal oxides have to be regenerated by means of oxygen from time to time in order to retain their ability to separate off hydrogen. WO 2007/099 028 A1 proposes reacting the hydrogen formed in the reaction with an oxidant such as air, oxygen, CO, $CO_2$, NO and/or $N_2O$. However, undesirable by-products can be formed here, depending on the starting materials used for the original chemical reaction. Another disadvantage of this way of separating off hydrogen is the lack of an opportunity to recover the hydrogen directly as valuable raw material.

An alternative is described in WO 2007/025 882 A1, according to which the removal is effected by a membrane which is selectively permeable to hydrogen. Here, the hydrogen migrates as $H_2$ molecule through a membrane for which palladium and palladium alloys are preferably used. The diffusion rate depends on the difference in the hydrogen partial pressure between the two sides of the membrane used. Consequently, to achieve a better separation, it is necessary to produce a sufficiently high hydrogen partial pressure difference between the two sides of the membrane, which is frequently possible only at high temperatures and/or high pressures. However, these measures have an adverse effect on the energy balance. In addition, the position of the thermodynamic equilibrium of particular reactions does not make it possible to produce sufficiently high hydrogen partial pressure differences.

WO 2010/115 786 A1 discloses a process for converting natural gas into aromatics with electrochemical removal of hydrogen and production of electric power or hydrogen. In this process, part of the hydrogen formed during the reaction of a feedstream is separated off by means of a membrane-electrode assembly of the type in question. The membrane-electrode assembly has a selectively proton-conducting membrane and at least one electrode catalyst on each side of the membrane. Part of the hydrogen is oxidized to protons on the anode side of the membrane and the protons are, after passage through the membrane, either reduced to hydrogen with application of an electric potential or are reacted with oxygen to form water and generate electric power on the cathode side.

In the case of industrial applications of hydrogen removal, large membrane areas are required. These mean, especially according to the last-named prior art, a high usage of catalytically active material for the electrode catalysts, which frequently comprises noble metals from the platinum group, e.g. platinum, rhodium, ruthenium or palladium. Large membranes therefore become very expensive because of the amount of catalytically active material required. There is therefore a need to reduce the amount of the catalytically active material.

In the light of the abovementioned prior art, it is an object of the present invention to provide a membrane-electrode assembly and a process for separating off hydrogen, by means of which a separation of hydrogen from the reaction mixture with improved effectiveness while at the same time saving catalytically active material is made possible.

This object is, in a first aspect of the present invention, achieved by a membrane-electrode assembly (1) comprising
   a gastight, selectively proton-conducting membrane (3) which has a retentate side (5) having an anode (7) and a permeate side (9) having a cathode (11),
   a voltage source (13) for generating a potential difference between the anode (7) and the cathode (11),
   an anode catalyst (15) having a catalytically active material on the retentate side (5) and
   a cathode catalyst (17) having a catalytically active material on the permeate side (9), wherein the cathode catalyst (17) has a smaller amount of catalytically active material than the anode catalyst (15).

In a second aspect of the present invention, the abovementioned object is achieved by a process for separating off hydrogen, which comprises the steps
a) carrying out a chemical reaction in which a mixed product gas comprising hydrogen is formed in a reactor according to claim 10,
b) feeding the mixed product gas to the retentate side (5) of a membrane-electrode assembly (1) as described above,
c) electrochemical removal of at least part of the hydrogen comprised in the mixed product gas by means of the membrane-electrode assembly (1) as described above, wherein at least part of the hydrogen is oxidized to protons over the anode catalyst (15) on the retentate side (5) of the membrane (3) and the protons are, after traversing the membrane (3), reduced to hydrogen over the cathode catalyst (17) on the permeate side (9).

In the present invention, electrochemical separation of the hydrogen from the mixed product gas is employed. This is significantly more effective compared to removal by means of conventional membrane-electrode assemblies and processes for separating off hydrogen. At the same membrane area, significantly more hydrogen can thus be separated off, so that less hydrogen remains in the mixed product gas. This ensures, compared to the abovementioned prior art, a significantly greater shift of the thermodynamic equilibrium to the product side and significantly improves the economics of the chemical reaction. In addition, the present invention reduces the outlay in terms of apparatus for separating off hydrogen. Furthermore, the membrane-electrode assembly (1) of the invention makes do with significantly smaller amounts of catalytically active material compared to the membrane-electrode assemblies described in the prior art.

The invention is described in detail below.

When process features are mentioned in the following description of the membrane-electrode assembly (1) of the invention, these relate particularly to the process of the invention, which will be explained in more detail below. When, on the other hand, physical features of the membrane-electrode assembly 1 are indicated in the description of the process of the invention, these relate particularly to the membrane-electrode assembly (1) which will be explained in more detail below.

The present invention provides, in a first aspect of the present invention, a membrane-electrode assembly (1) which comprises
- a gastight, selectively proton-conducting membrane (3) which has a retentate side (5) having an anode (7) and a permeate side (9) having a cathode (11),
- a voltage source (13) for generating a potential difference between the anode (7) and the cathode (11),
- an anode catalyst (15) having a catalytically active material on the retentate side (5) and
- a cathode catalyst 17 having a catalytically active material on the permeate side (9).

Here, the cathode catalyst (17) has less catalytically active material than the anode catalyst 15.

The membrane-electrode assembly (1) of the invention is intended in particular for separating off hydrogen. It comprises essentially the gastight, selectively proton-conducting membrane (3) which is arranged between the two electrodes (7, 11). Generation of an electrical potential difference between the two sides of the membrane-electrode assembly (1) enables hydrogen to be oxidized selectively to protons on the retentate side (5) according to the following equation:

$$H_2 \rightarrow 2H^+ + 2e^-$$

Owing to the potential difference, the protons can then be transported through the membrane (3) and be reduced to hydrogen on the permeate side (9) according to the following equation:

$$2H^+ + 2e^- \rightarrow H_2$$

The membrane-electrode assembly (1) of the invention offers a series of advantages, especially for the electrochemical removal of hydrogen. Firstly, the hydrogen is obtained as valuable by-product, for example in contrast to a selective oxidation of the hydrogen as in the prior art. In addition, hydrogen is obtained in very high purity (typically >99.9%) because of the fact that the membrane (3) of the invention is a selective proton conductor. Furthermore, the driving force for the passage of hydrogen through the membrane (3) is not a partial pressure difference on both sides as in the prior art but instead an electrical potential difference between the electrodes (7, 11). The hydrogen can consequently also be pumped from a region having a relatively low partial pressure to a region having a higher partial pressure, as a result of which even small amounts of hydrogen can be removed or compressed hydrogen can be produced directly. The pressures of the mixed product gas and of the hydrogen can be managed very flexibly and are limited only by the mechanical stability of the membrane-electrode assembly (1).

A further advantage is the fact that the membrane (3) of the invention is not embrittled by the hydrogen, as is the case, for example, for palladium-comprising membranes. Finally, the electrochemical removal of hydrogen can be employed in a very wide temperature range, in the case of polymer membrane (3) of the invention from 10° C. to about 200° C. Ceramic proton conductors allow a temperature range up to 1000° C.

The thickness of the membrane-electrode assembly (1) of the invention is from 250 μm to 2100 μm, preferably from 600 μm to 1500 μm.

The membrane-electrode assembly (1) of the invention meets the requirements of a very good electromembrane, especially in respect of a high degree of removal of hydrogen of more than 95% without displaying any significant deterioration in the performance over time. Furthermore, the membrane of the invention is sufficiently conductive for protons, displays a negligible electronic conductivity, is gastight, mechanically stable and also resistant to the mixed product gas.

For the purposes of the present invention, a "gastight" membrane is a membrane which has virtually no porosity through which gases could pass in atomic or molecular form from one side of the membrane to the other side of the membrane. "Gastight" also means that no gases are transported unselectively through the membrane, for example by absorption, dissolution in the membrane, diffusion and desorption. The property "selectively proton-conducting" additionally means that the membrane does not, in particular, conduct electrons.

The membrane (3) is preferably configured as a plate or tube, with the customary membrane arrangements known from the prior art for fragmenting gas mixtures being able to used. According to the invention, any material which is known to those skilled in the art and from which a gastight and selectively proton-conducting membrane (3) in the sense of the present invention can be formed can be used for the membrane (3). These include, for example, the materials described by J. W. Phair and S. P. S. Badwal in Ionics (2006) 12, pages 103-115 (especially polybenzimidazoles). Selectively proton-conducting membranes as are known from fuel cell technology can also be used for the purposes of the invention.

Polymer membranes for which sulfonated polyether ether ketones (S-PEEK), sulfonated polybenzimidazoles (S-PBI) and sulfonated fluoropolymers (NAFION®) and likewise perfluorinated polysulfonic acids, polymers based on styrene, poly(arylene ethers), polyimides and polyphosphazenes can be used as suitable polymers are particularly suitable for producing a gastight and selectively proton-conducting membrane (3) according to the present invention. In particular, it is also possible to use polybenzimidazole membranes based on polybenzimidazole which is doped or impregnated with phosphoric acid.

The term "retentate side" refers to the side of the membrane-electrode assembly (1) over which the hydrogen-comprising product stream is passed. On the other hand, the term "permeate side" refers to the side of the membrane-electrode assembly (1) at which the gaseous hydrogen is discharged.

The term "anode catalyst (15)" refers, for the purposes of the present invention, to the electrode catalyst on the retentate side (5), while the "cathode catalyst (17)" is the electrode catalyst on the permeate side (9).

As "catalytically active material", it is possible to use the customary compounds and elements which can catalyze the dissociation of molecular hydrogen into atomic hydrogen, the oxidation of hydrogen to protons and the reduction of protons to hydrogen and are known to those skilled in the art. Examples of suitable materials are Pd, Pt, Cu, Ni, Ru, Fe, Co, Cr, Mn, V, W, tungsten carbide, Mo, molybdenum carbide, Zr, Rh, Ru, Ag, Ir, Au, Re, Y, Nb and also alloys and mixtures thereof; preference is given according to the invention to Pt. The catalytically active materials can also be present in supported form, with preference being given to using carbon as support.

In an embodiment of the membrane-electrode assembly (1), the amount of the catalytically active material of the cathode catalyst (17) is from 0.001 mg/cm² to 1.00 mg/cm², preferably from 0.05 mg/cm² to 0.70 mg/cm², based on the total area of the cathode (11).

Below an amount of 0.001 mg/cm², a satisfactory catalytic activity is no longer ensured, while an amount of more than 1.00 mg/cm² no longer leads to any further improvement in the catalytic activity. High loadings per unit area of more than 1.00 mg/cm², particularly in the case of catalyst having low specific loadings (catalyst on support), lead to thick catalyst layers which in turn have an adverse effect on the overall performance. Thin catalyst layers generally have advantages in respect of mass transfer properties.

It has been found that a symmetrical distribution of the catalytically active material over anode catalyst (15) and cathode catalyst (17) while at the same time reducing the amount does not lead to the desired and necessary degree of removal of hydrogen. However, it has surprisingly been found that, in one embodiment of the invention, an unsymmetrical distribution of the catalytically active material leads to advantageous effects when the ratio of the amount of the catalytically active material of the cathode catalyst (17) to the amount of the catalytically active material of the anode catalyst (15) is from 1:100 to 1:1.25, in particular 1:1.5-5.0, preferably 1:1.75-3.0. The total amount of catalyst used is thus reduced, while at the same time a substantial tolerance to impurities of the retentate side (5) is achieved on the anode side by the abovementioned higher loading. Long operating lives can be achieved in this way. In particular, a high degree of removal of hydrogen of still more than 95% can be achieved despite a significant reduction in the amount of the catalytically active material of the cathode catalyst (17).

In the unsymmetrical distribution of the catalytically active material over anode catalyst (15) and cathode catalyst (17), the greater amount of catalytically active material is provided on the retentate side (5) (anode side). It is known from the prior art that, owing to impurities comprised in a product gas, a minimum amount of catalytically active material has to be present in the electrode catalysts. It has surprisingly been found in the present invention that, in contrast, a smaller amount of catalytically active material is sufficient on the permeate side (9) (cathode side) without adversely affecting the degree of removal of hydrogen. The present invention therefore differs fundamentally from fuel cells which are operated using hydrogen and for which unsymmetrical catalyst loadings with higher loadings on the cathode side are prior art.

For achieving effective removal of hydrogen, particular preference is given to the anode catalyst (15) and/or the cathode catalyst (17) having platinum as catalytically active material. In contrast, alloy catalysts and base metal catalysts are known from the literature for hydrogen oxidation (anode) and hydrogen evolution (cathode), but these have disadvantages in respect of long-term stability compared to platinum. The principle described can basically also be applied to other catalysts.

In a further embodiment of the invention, the retentate side (5) and/or the permeate side (9) each have an active area of the membrane-electrode assembly (1) which comprises the catalytically active material. The active area of the membrane-electrode assembly (1) is from 5 cm² to 20 000 cm², preferably from 25 cm² to 10 000 cm². Active areas of less than 5 cm², preferably 25 cm², are not economically feasible for the intended industrial use of the membrane-electrode assembly (1) of the invention. An area of more than 10 000 cm², preferably 6000 cm², is no longer useful in industrial implementation since the incidence of defects increases with increasing size.

For the purposes of the present invention, the term "active area" refers to the area of the membrane-electrode assembly (1) which is actually available for the oxidation/reduction of the hydrogen. In practical terms, this means that the entire geometric area of the electrode catalyst (15, 17) is not available since these areas are, at least in the peripheral region, covered by a frame with holder and appropriate sealing material and are thereby reduced.

In an embodiment of the membrane-electrode assembly (1),
the anode (7) is a gas diffusion electrode which has a gas diffusion layer (19) adjoining the membrane (3) and a microporous layer (21) applied thereto, on top of which the anode catalyst (15) has been applied,
and/or
the cathode (11) is a gas diffusion electrode which has a gas diffusion layer (23) adjoining the membrane (3) and a microporous layer (25) applied thereto, on top of which the cathode catalyst (17) has been applied.

Since the membrane (3) according to the invention is itself gastight, as described above, it is advantageous for good contact of the membrane (3) with the hydrogen present on the retentate side (5) and good transport of the hydrogen which has been separated off away on the permeate side (9) for the gas diffusion electrodes (7, 11) to be permeable to gas. Gas diffusion layers (19, 23) and microporous layers (21, 25) are provided for this purpose. The material of the microporous layers (21, 25) can formally be considered to be electrode material and the gas diffusion layers (19, 23) can formally be considered to be supports. However, since the materials of the microporous layers (21, 25) and the gas diffusion layers (19, 23) are electrically conductive, these in practical terms together form the electrodes (7, 11).

For the purposes of the present invention, the term "gas diffusion electrode" refers to the totality of gas diffusion layers (19, 23), microporous layers (21, 25) and electrode catalysts (15, 17).

A "gas diffusion layer" is, for the purposes of the present invention, a porous layer which makes diffusion of hydrogen in the gaseous state to the membrane (3) possible. According to the invention, the gas diffusion layer (19, 23) has a pore size of from 0.5 µm to 50 µm and a thickness in the range from 100 µm to 500 µm.

Furthermore, a "microporous layer" is, for the purposes of the present invention, a layer having a pore size of from 250 nm to 15 µm and a thickness in the range from 5 µm to 150 µm.

Preference is given to the gas diffusion layers (19, 23) being made up of an electronically conductive and open-pored material, in particular nonwoven, woven fabric, paper, felt, foam, lay-ups or knits. In particular, the gas diffusion layers (19, 23) can be plates having a grid-like surface structure made up of a system of fine channels or layers. As a result, the hydrogen to be separated off is brought close to the membrane (3) on the retentate side (5) and transport of the hydrogen formed away on the permeate side (9) is aided.

In particular, the gas diffusion layers (19, 23) and/or the microporous layers (21, 25) have good electronic conductivity and stability of the carbon (i.e. both chemical stability and stability under an applied electric potential).

In a second aspect, the present invention provides a reactor comprising at least one apparatus for carrying out a chemical reaction in which a mixed product gas comprising hydrogen is formed, and at least one membrane-electrode assembly (1) as has been described above. Here, the membrane-electrode assembly (1) is joined to the apparatus in such a way that at least part of the mixed product gas can be conveyed from the apparatus onto the retentate side (5) of the membrane-electrode assembly (1).

In a particular embodiment, the reactor is a plant for dehydroaromatizing hydrocarbons. Furthermore, the membrane-electrode assembly (1) can be arranged directly on or in the reactor when the membrane comprises a ceramic proton conductor. In this way, the equilibrium can be shifted in situ and the gas stream does not have to be cooled first.

A third aspect of the present invention provides a process for separating off hydrogen, which comprises the steps
a) carrying out of a chemical reaction in which a mixed product gas comprising hydrogen is formed in a reactor according to claim 10,
b) feeding of the mixed product gas to the retentate side (5) of a membrane-electrode assembly (1) as has been described above and
c) electrochemical removal of at least part of the hydrogen comprised in the mixed product gas by means of the membrane-electrode assembly (1) as has been described above.

On the retentate side (5) of the membrane (3), at least part of the hydrogen is oxidized to protons over the anode catalyst (15), and the protons are, after traversing the membrane (3), reduced to hydrogen over the cathode catalyst (17) on the permeate side (9).

Compared to some of the abovementioned processes from the prior art, the process of the invention has the advantage that complicated and costly interruptions of the chemical reaction or the synthesis become superfluous and that the synthesis can be operated continuously over a longer period of time. In addition, compared to known processes in which gaseous oxidants such as air, oxygen, CO, $CO_2$, NO or $N_2O$ are used, the process of the invention makes do without a physically complicated and costly removal of the by-products formed by the addition of oxidant. When oxygen or air is used as oxidant, for example, water is formed and the presence of this can have an adverse effect on particular reactions.

The process of the invention has a particular advantage over the known processes in which hydrogen is separated off as $H_2$ molecule by means of a hydrogen-selective membrane. This particular advantage lies in the electrochemical removal of the hydrogen formed from the mixed product gas. The driving force for the electrochemical removal of hydrogen according to the invention is the potential difference between the two sides of the membrane (3). Since the separation is not dependent on the difference in the hydrogen partial pressure between the two sides of the membrane (3) as is the case for the hydrogen-selective membranes conventionally used, the removal of hydrogen can be carried out at very much lower partial pressures and partial pressure differences; an externally applied pressure difference can preferably be dispensed with entirely. In particular, approximately the same pressure prevails on the retentate side (5) and the permeate side (9). The mechanical stress on the membrane (3) is thereby reduced considerably, which, inter alia, increases the long-term stability of the membrane and also increases the range of materials possible for the membrane (3). If pressure-resistant membranes are used, it is also possible to produce compressed hydrogen.

The electrochemical removal of the hydrogen is significantly more effective than removal by means of conventional hydrogen-selective membranes. For the same separation performance, the membrane area required can therefore be decreased or, in the case of the same membrane area, significantly more hydrogen can be separated off. Overall, the process of the invention is therefore associated with a smaller outlay in terms of apparatus.

As a result of the more effective removal of hydrogen, the proportion of the hydrogen remaining in the reaction mixture is significantly lower than in conventional processes. In this way, a significantly greater shift in the thermodynamic equilibrium to the side of the desired products compared to processes described in the prior art is ensured and the economics of the chemical process are significantly improved. In addition, the process described also makes it possible to achieve defined degrees of depletion without further analytical methods by determining the quantity of electric power.

Compared to the last-mentioned prior art above, the process of the invention also has the advantage that a significantly smaller amount of catalytically active material is sufficient to achieve the same degree of removal of hydrogen.

For the purposes of the present invention, the term "mixed product gas" refers to a mixture which is formed when carrying out the chemical reaction in step a) and usually comprises the desired reaction product and hydrogen. In addition, the mixed product gas can comprise unreacted starting materials and traces of other gases.

In the electrochemical removal by means of the above-described membrane-electrode assembly (1) carried out in step c), the hydrogen to be separated off is transported away in the form of protons through the membrane (3). For this transport of the protons through the membrane (3), electric energy, which is preferably supplied by application of a DC voltage to the electrodes (7, 11) of the membrane-electrode assembly (1), is used.

In an embodiment of the process of the invention, the chemical reaction in step a) is a dehydroaromatization of $C_1$-$C_4$-alkanes. Since a very large amount of hydrogen is obtained as by-product in this reaction, the present invention is particularly effective here. The hydrogen separated off is largely free of impurities. Since the hydrogen obtained in the gas mixture has a low partial pressure, the use of membranes by means of which $H_2$ is separated off selectively as molecule is not appropriate.

In one embodiment, at least 30%, preferably at least 50%, particularly preferably at least 70%, very particularly preferably at least 95% and in particular at least 98%, of the hydrogen comprised in the mixed product gas is separated off from the mixed product gas. The more hydrogen separated off from the mixed product gas, the greater the degree to which the equilibrium of the chemical reaction is shifted to the product side, as a result of which the product yield increases. If the gas on the retentate side (5) is conveyed back into the reactor, this gas stream is decreased by means of more efficient removal of hydrogen.

The removal of the hydrogen is preferably carried out at temperatures of from 20° C. to 200° C., preferably from 50° C. to 180° C. and in particular from 60° C. to 165° C. The process conditions of the invention are thus designed for the membrane-electrode assembly (1) of the invention. In addition, energy saving effects can be achieved by means of significantly lower temperatures. In a particular embodiment, the dehydroaromatization of $C_1$-$C_4$-alkanes and thus the removal of the hydrogen are carried out at temperatures of from 140° C. to 165° C.

It has been found to be advantageous in terms of the removal of hydrogen for the removal of hydrogen to be carried out at voltages of from 0.05 mV to 2000 mV, preferably from 50 mV to 1000 mV, particularly preferably from 100 mV to 600 mV. In the preferred dehydroaromatization of $C_1$-$C_4$-alkanes, the voltage is in particular from 100 mV to 400 mV.

The removal of hydrogen by the process of the invention is preferably carried out at pressures of from 0.5 bar to 40 bar, preferably from 1 bar to 6 bar, particularly preferably from 1 bar to 4 bar, in particular from 3 bar to 4 bar. In a preferred embodiment of the invention, the pressure difference between the retentate side 5 and the permeate side (9) of the membrane (3) is less than 1 bar, preferably less than 0.5 bar, and there is particularly preferably virtually no pressure difference.

The hydrogen obtained on the permeate side (9) comprises not more than 5 mol %, preferably not more than 2 mol % and particularly preferably not more than 1 mol %, of gaseous impurities. In addition, the hydrogen can, depending on the selectively proton-conducting membrane used, comprise up to 30 mol %, preferably up to 15 mol %, particularly preferably up to 10 mol % of water. The presence of water is desirable in the case of some types of membrane, for example in the case of particular polymer membranes for humidifying the polymer membranes. It is possible to humidify both from the permeate side (9) and from the retentate side (5).

The hydrogen separated off can be dried before further use. This can, in particular, be carried out when the separation has been carried out by means of a particular type of polymer membrane which has to be humidified. Likewise, the retentate gas stream can be dried when it is recirculated to the reaction.

Further objectives, features, advantages and possible uses can be derived from the following description of examples of the invention with the aid of the figures. Here, all features described and/or depicted form, individually or in any combination, the subject matter of the invention, also as a function of their summary in the claims or back-reference. In the figures:

FIG. (1) schematically shows a membrane-electrode assembly 1 in order to indicate the processes in the removal of hydrogen.

Figure 1:
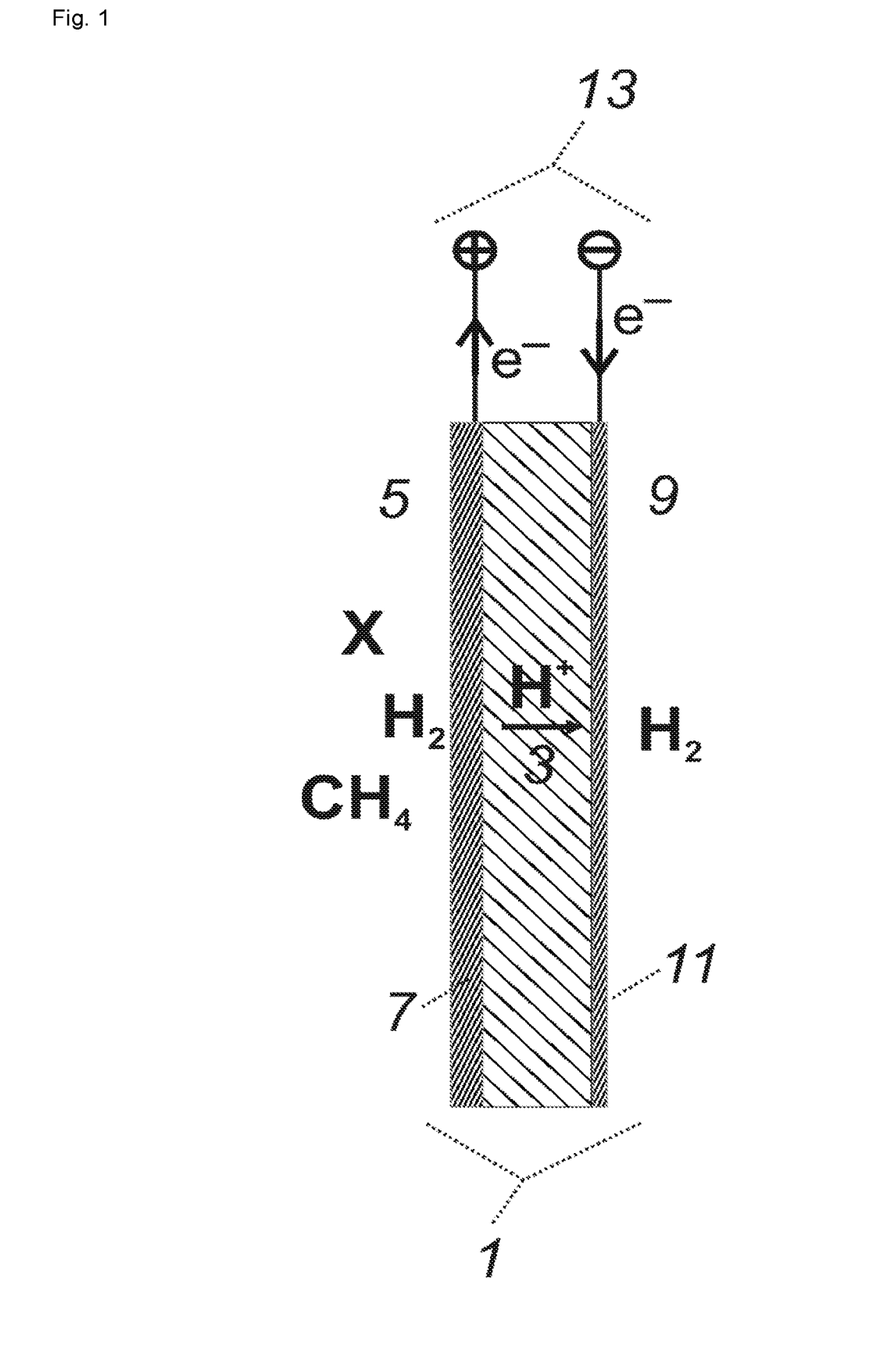

FIG. 1 shows the basic concept of an electron membrane. A mixed gas comprising, in the present example, methane ($CH_4$), hydrogen ($H_2$) and impurities (X) is introduced on the anode side (retentate side 5) of the membrane-electrode assembly 1. At the anode 7, the hydrogen $H_2$ comprised in the mixed product gas is oxidized to protons $H^+$ and passes through the proton-conducting membrane 3 as a result of application of a potential difference between the anode 7 and the cathode 11 by means of the voltage source 13. On the cathode side (permeate side 9), the protons are reduced back to hydrogen in the gaseous state with addition of electrons.

Figure 2A:
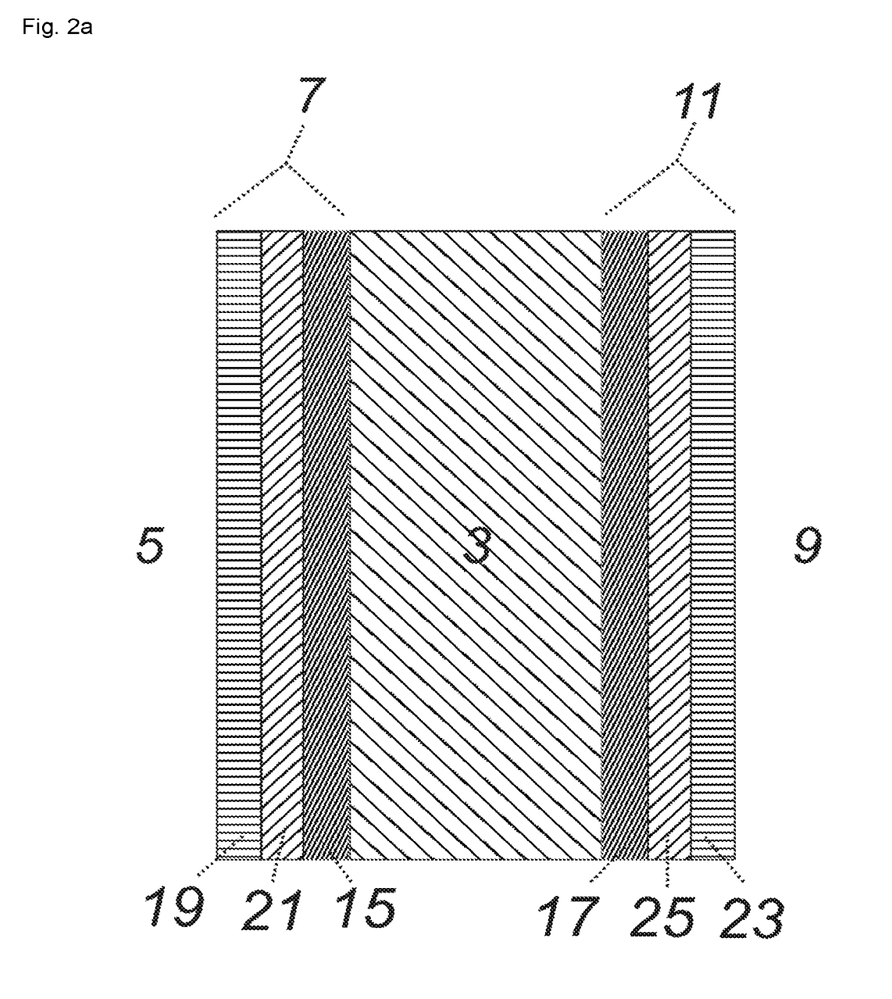
FIG. 2a shows a schematic sectional view of a membrane-electrode assembly 1 according to one embodiment of the invention.

FIG. 2a schematically shows the construction of a membrane-electrode assembly 1 according to the invention in a preferred embodiment. The core is formed by the membrane 3 which in this embodiment consists of polybenzimidazole doped with phosphoric acid. The membrane 3 is purely proton-conducting and gastight. A gas diffusion electrode 7, 11 is arranged on each side of the membrane 3. In the present embodiment, the gas diffusion electrodes 7, 11 have a symmetrical structure.

Figure 2B:
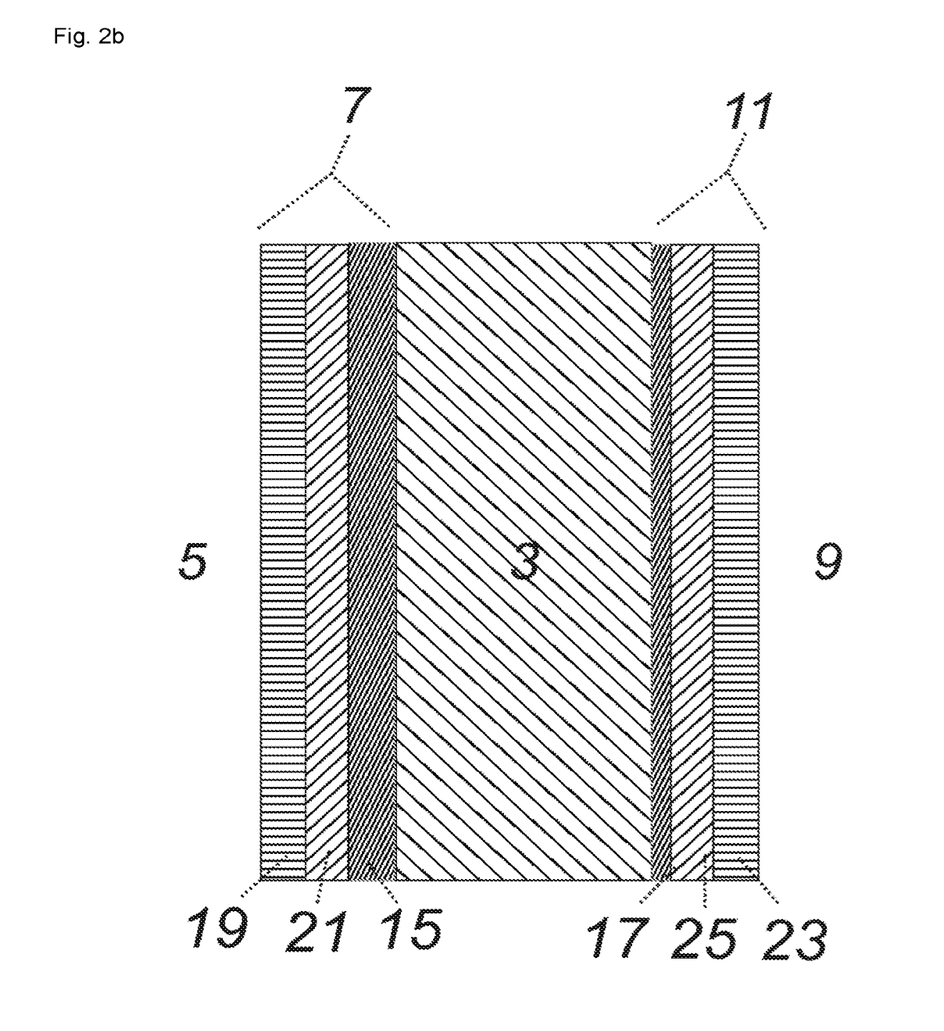
FIG. 2b shows a schematic sectional view of a membrane-electrode assembly 1 according to another embodiment of the invention.

FIG. 2b schematically shows the construction of a membrane-electrode assembly 1 according to the invention in another preferred embodiment having an unsymmetrical structure.

To form the gas diffusion electrode, an electronically conductive and gas-permeable woven carbon fiber fabric is firstly used as gas diffusion layer 19, 23. This is coated with a microporous layer 21, 25 which in the present invention consists of carbon (e.g. industrial carbon black). The catalyst 15, 17 (optionally a supported catalyst, e.g. catalyst on a carbon support) is applied to the microporous layer. An ink comprising the carbon particles loaded with platinum (catalyst), water, dispersants (for example Nafion® or EFKA®) and thickeners, (for example Xanthan) can, for example, be produced for this purpose and this can then be printed on. This gas diffusion electrode 7, 11 is joined to the membrane 3, with the catalyst-coated side being in direct contact with the membrane.

Unsymmetrical membranes (FIG. 2b) differ from symmetrical members (FIG. 2a) in that a smaller amount of catalyst is applied to the cathode 11 compared to the anode 7.

EXAMPLES

First Embodiment

A first example of the use of the membrane-electrode assembly 1 of the invention is a novel and cost-effective route for preparing benzene (and also naphthalene) from natural gas, preferably by dehydroaromatization. This endothermic reaction according to the equation $$6CH_4 \rightarrow C_6H_6 + 9H_2$$

is a reaction which is limited by the thermodynamic equilibrium and gives a conversion of less than 20% at from 700° C. to 800° C. Consequently, to increase the efficiency, the unreacted methane has to be recycled and the hydrogen produced (always 9 mol per 1 mol of benzene) has to be removed beforehand.

Construction of the Membrane-Electrode Assembly 1

The membrane-electrode assembly 1 had a polybenzimidazole membrane 3 doped with phosphoric acid, which is marketed by BASF SE under the product name "Celtec P®". Gas diffusion electrodes 7, 11 composed of carbon/platinum were arranged on both sides of the membrane 3. The active area of the membrane 3 was 25 cm² in the specific examples.

The Celtec P® membrane 3 used according to the invention is a gel-type membrane which conducts protons at a high temperature (from 120° C. to 180° C.) and has a high tolerance to impurities such as CO or sulfur in the mixed product gas.

The gas diffusion electrodes 7, 11 consisted of an electronically conductive woven carbon fiber fabric; the gas diffusion layer 9, 23 was covered with a microporous layer 21, 25 composed of industrial carbon black. As catalyst 15, 17, use was made of platinum supported on carbon (Vulcan XC72) with loadings in the range from about 10% to about 30% of Pt (based on the total mass of the catalyst consisting of platinum and carbon). The amount of platinum on the gas diffusion electrodes 7, 11 is indicated in the following tables.

General Test Conditions

Based on the specific use of the present membrane-electrode assembly 1 for benzene production, a test gas mixture (i.e. the gas supplied to the anode) comprised 88.1% of $CH_4$ and 11.4% of $H_2$ together with traces of impurities (5000 ppm of $C_2H_4$, 100 ppm of $C_6H_6$ and 50 ppm of $C_2H_6$). During the experiments, the cathode 11 was in each case flushed with $N_2$. The typical flow rates for both the anode gas stream and the cathode gas stream was 500 ml per minute. As potential difference, 150 mV were applied. The membrane-electrode assemblies 1 were humidified (2 g/h of water on the cathode side). The test temperature was 160° C. For the specific membrane-electrode assembly 1, a gauge pressure of 3 bar was set on the anode side and the cathode side.

Measurement Data and Analysis

Figure 4:
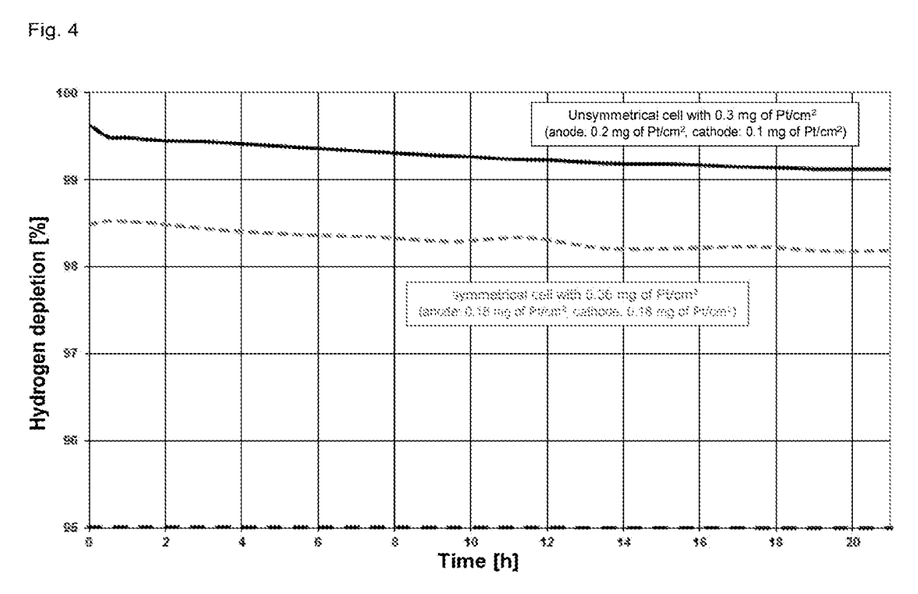
FIG. 4 shows a graph depicting the degree of removal of hydrogen over time for a membrane-electrode assembly 1 according to the first embodiment of the invention in example 3 and FIG. 5 shows a graph depicting the degree of removal of hydrogen over time for a membrane-electrode assembly 1 according to the second embodiment of the invention in example 4.

During the experiments, the current (I), the voltage (V), the time (t), the cell temperature (T), the gauge pressure ($p_{an}$, $p_{cath}$) at the anode 7 and at the cathode 11 and the gas composition at the outlet from the anode 7 were determined by gas chromatography. Proceeding from the data determined in this way, the degree of removal of hydrogen can be calculated in two different ways. On the one hand, the measured current corresponds according to Faraday's law to the protons transported through the membrane 3. The ratio of the hydrogen transported through the membrane 3 to the known amount of hydrogen at the anode 7 leads to the value of the current-based removal of hydrogen. On the other hand, the known hydrogen content at the anode 7 and the hydrogen content measured on the side of the cathode 11 can be used to calculate a gas chromatography-based removal of hydrogen. The current-based and gas chromatography-based degrees of removal do not display any significant differences, for which reason only the gas chromatography-based degrees of removal are shown in FIGS. 2 and 4.

Example 1 (According to the Invention)

Figure 3:
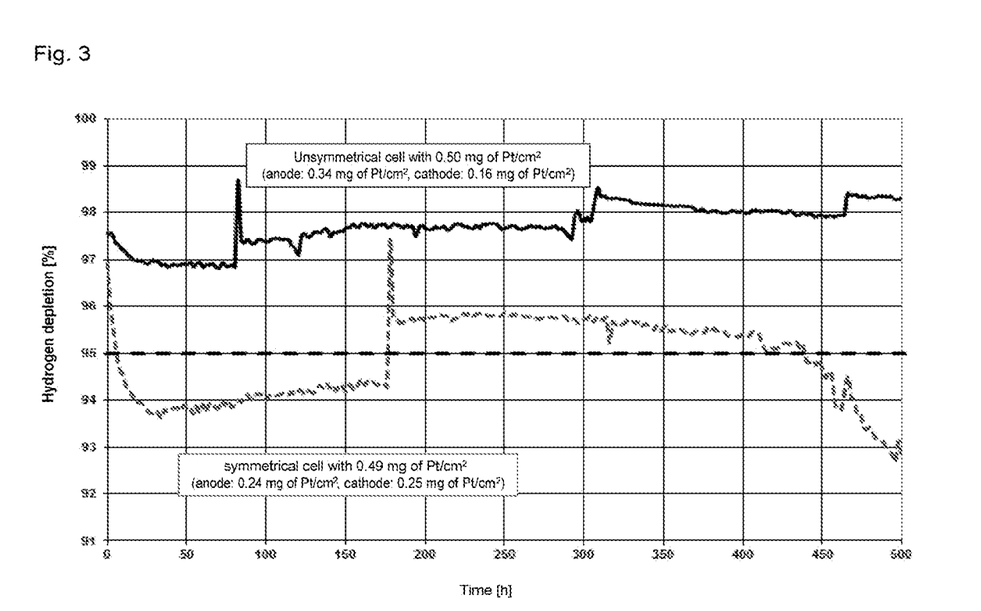
FIG. 3 shows a graph depicting the degree of removal of hydrogen over time for a membrane-electrode assembly 1 according to the first embodiment of the invention in example 1.

The total platinum loading was 0.50 mg/cm², with 0.34 mg/cm² of Pt being present on the anode side and only 0.16 mg/cm² being present on the cathode side (unsymmetrical structure). The catalyst used was loaded with about 30% of Pt. Compared to a symmetrical cell having 1 mg/cm² of Pt on each side (prior art), the amount of Pt has been reduced by 75%. Using this cell, from 97% to 98% of the hydrogen could be separated off from the gas mixture under the experimental conditions described in "General test conditions". FIG. 3 shows the degrees of removal of hydrogen for example 1 and comparative example 1.

Example 2 (According to the Invention)

The total platinum loading was 1.26 mg/cm², with 0.79 mg/cm² of Pt being present on the anode side and only 0.47 mg/cm² being present on the cathode side (unsymmetrical structure). The catalyst used was loaded with about 15% of Pt. Compared to a symmetrical cell having 1 mg/cm² of Pt on each side (prior art), the amount of Pt has been reduced by 37%. Using this cell, more than 99% of the hydrogen could be separated off from the gas mixture under the experimental conditions described in "General test conditions".

Example 3 (According to the Invention)

The total platinum loading was 0.30 mg/cm², with 0.20 mg/cm² of Pt being present on the anode side and only 0.10 mg/cm² being present on the cathode side (unsymmetrical structure). The catalyst used was loaded with about 10% of Pt. Compared to a symmetrical cell having 1 mg/cm² of Pt on each side (prior art), the amount of Pt has been reduced by 85%. Using this cell, more than 99% of the hydrogen could be separated off from the gas mixture under the experimental conditions described in "General test conditions".

Comparative Example 1 (Not According to the Invention)

The total platinum loading was 0.49 mg/cm²; this loading is virtually identical to that in example 1. As in example 1, a catalyst loaded with about 30% of Pt was used. In contrast to example 1, a symmetrical cell having 0.24 mg/cm² of Pt on the anode and 0.25 mg/cm² of Pt on the cathode was tested in the comparative example (symmetrical structure). Using this cell, from 93% to 96% of the hydrogen could be separated off from the gas mixture under the experimental conditions described in "General test conditions", i.e. significantly less than in example 1 (from 97% to 98%). FIG. 3 shows the degrees of removal of hydrogen for example 1 and comparative example 1.

Comparative Example 2 (Not According to the Invention)

The total platinum loading was 1.26 mg/cm²; this loading is identical to that in example 2. As in example 2, a catalyst loaded with about 15% of Pt was used. In contrast to example 2, a symmetrical cell having 0.64 mg/cm² of Pt on the anode and 0.62 mg/cm² of Pt on the cathode was tested in the comparative example (symmetrical structure). Using this cell, less than 96% of the hydrogen could be separated off from the gas mixture under the experimental conditions described in "General test conditions", i.e. significantly less than in example 2 (>99%).

Comparative Example 3 (Not According to the Invention)

The total platinum loading was 0.36 mg/cm²; this loading is higher than in example 3 (+0.06 mg/cm² of Pt). As in example 3, a Pt particle catalyst supported on carbon and having a loading of 10% of Pt was used. In contrast to example 3, a symmetrical cell having 0.18 mg/cm² of Pt on the anode and 0.18 mg/cm² of Pt on the cathode was tested in the comparative example (symmetrical structure). Using this cell, less than 98.5% of the hydrogen could be separated off from the gas mixture under the experimental conditions described in "General test conditions", i.e. significantly less than in example 3 (>99%) in the unsymmetrical structure with less platinum.

The following table 1 show examples 1 to 3 and comparative examples 1 to 3 to indicate the influence of the amount of catalytically active material on the side of the anode 7 and on the side of the cathode 11. At an identical amount of Pt, higher degrees of removal of hydrogen can be achieved when using unsymmetrical cells than when using symmetrical cells. Table 1 also shows that a significant cost reduction can be achieved when a smaller amount of catalytically active material is present on the side of the cathode 11 than on the side of the anode 7. As can be seen from table 1, reductions in the platinum content of up to 85% can be realized, with the degree of removal of hydrogen continuing to remain above 95%.

TABLE 1

| Example/ Comparative example and cell design | Pt catalyst in total cell [mg/cm$^2$] | H$_2$ removal [%] | Pt in anode [mg/cm$^2$] | Pt in cathode [mg/cm$^2$] | Pt loading on carbon support [%] | Pt reduction * [%] |
|---|---|---|---|---|---|---|
| Example 1 (unsym.) | 0.50 | 97-98 | 0.34 | 0.16 | ≈30 | 75.0 |
| Comparative example 1 (sym.) | 0.49 | 93-96 | 0.24 | 0.25 | ≈30 | 75.5 |
| Example 2 (unsym.) | 1.26 | >99 | 0.79 | 0.47 | ≈15 | 37.0 |
| Comparative example 2 (sym.) | 1.26 | <96 | 0.64 | 0.62 | ≈15 | 37.0 |
| Example 3 (unsym.) | 0.3 | >99 | 0.20 | 0.10 | ≈10 | 85 |
| Comparative example 3 (sym.) | 0.36 | <98.5 | 0.18 | 0.18 | ≈10 | 82 |

* compared to a symmetrical cell having 2 mg/cm$^2$ of Pt (1 mg/cm$^2$ of Pt on each side).

Evaluation

FIG. 3 shows a graph depicting the removal of hydrogen when using the membrane-electrode assembly 1 as per example 1 (continuous line) and comparative example 1 (broken line) over 500 hours of operation. The unsymmetrical membrane-electrode assembly 1 as per example 1 showed good performance over 500 hours of operation with a degree of removal of hydrogen of from >97% to 98%. The course of the degree of removal of hydrogen for the symmetrical membrane-electrode assembly 1 as per comparative example 3 under identical experimental conditions, with the same catalyst (about 30% Pt loading) and comparable total amount of Pt (about 0.5 mg/cm$^2$ of Pt) over 500 hours of operation is likewise shown. The degree of removal of hydrogen is in this case significantly lower at from 93% to 96%.

Example 1 shows that traces of other hydrocarbons (e.g. ethane, benzene) do not damage the membrane 3 or deactivate the electrodes 7, 11.

FIG. 4 shows a graph depicting the removal of hydrogen when using the membrane-electrode assembly 1 as per example 3 (continuous line) and comparative example 3 (broken line) over 20 hours of operation. The unsymmetrical membrane-electrode assembly 1 as per example 3 showed good performance with a degree of removal of hydrogen of greater than 99%. The course of the degree of removal of hydrogen for the symmetrical membrane-electrode assembly 1 as per comparative example 3 under identical experimental conditions is likewise shown. The degree of removal of hydrogen is in this case significantly lower at about 98%.

As can also be seen from the results, no degradation of the platinum catalysts 15, 17 was observed for the unsymmetrical structure over 500 hours of operation, while in the case of the symmetrical structure, a significant reduction in the degree of removal of hydrogen was observed toward the end; in particular, the degree of removal dropped below the desired 95%.

Second Embodiment

A second example of the use of the membrane-electrode assembly 1 of the invention is the separation of H$_2$ a from a gas mixture containing CO$_2$, H$_2$ as well as traces of impurities (CH$_4$, C$_2$H$_4$, C$_2$H$_6$, C$_6$H$_6$,).

Construction of the Membrane-Electrode Assembly 1

The construction of the membrane-electrode assembly 1 is identical to the membrane-electrode assembly 1 described above in the first embodiment (examples 1 to 3). The amount of platinum on the gas diffusion electrodes 7, 11 can be taken from the following table 2.

Der Aufbau der Membran-Elektroden-Anordnung 1 ist identisch zu dem vorstehend in der ersten Ausfuhrüngsform beschriebenen Aufbau (Beispiele 1 bis 3). Die Menge des Platins auf den Gasdiffusionselektroden 7, 11 ist der nachstehenden Tabelle 2 zu entnehmen.

General Test Conditions (Example 4)

The test gas mixture (i.e. the gas supplied to the anode 7) contained 5% of H$_2$ in CO$_2$, as well as the following traces of impurities: 881 ppm CH$_4$, 5 ppm C$_2$H$_4$, 0.05 ppm C$_2$H$_6$ and 0.1 ppm C$_6$H$_6$. During the experiments, the cathode 11 was flushed with N$_2$. The typical flow rates for both the anode gas stream and the cathode gas stream was 500 ml per minute. As potential difference, 150 mV were applied. The membrane-electrode assemblies 1 were humidified (1 g/h of water on the cathode side). The test temperature was 160° C. For the specific membrane-electrode assembly 1, a gauge pressure of 3 bar was set on the anode side and the cathode side.

Measurement Data and Analysis

Measurement data and analysis are identical to the measurement data and analysis mentioned above in the first embodiment (examples 1 to 3).

Example 4 (According to the Invention)

Figure 5:
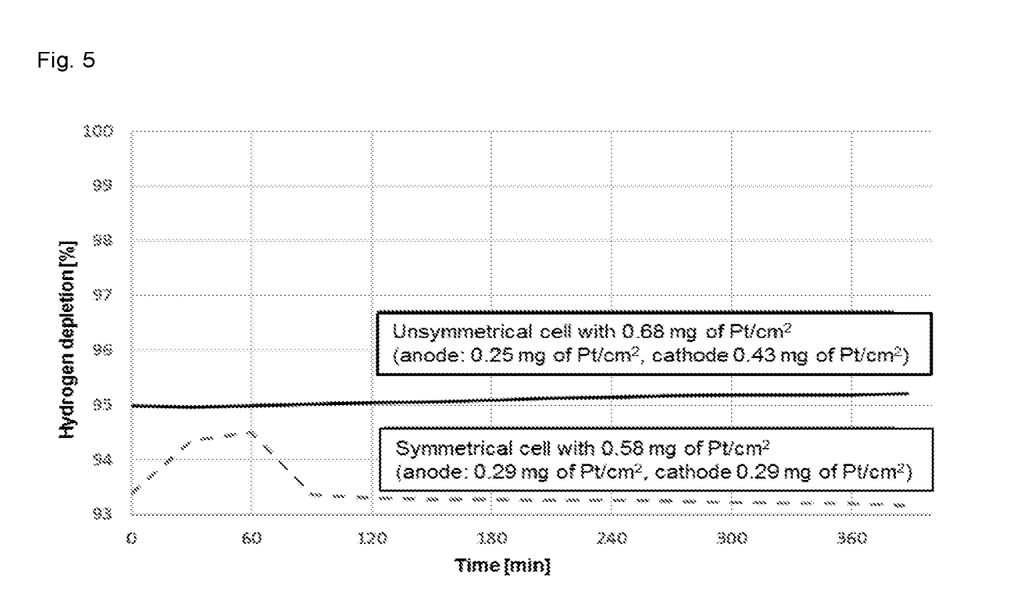

The total platinum loading was 0.68 mg/cm$^2$, with 0.43 mg/cm$^2$ of Pt being present on the anode side and only 0.25 mg/cm$^2$ being present on the cathode side (unsymmetrical structure). The catalyst used was loaded with about 16% of Pt. Compared to a symmetrical cell having 1 mg/cm$^2$ of Pt on each side (prior art), the amount of Pt has been reduced by 66%. Using this cell, appr. 95% of the hydrogen could be separated off from the gas mixture under the experimental conditions described in "General test conditions (example 4)". FIG. (5) shows the hydrogen removal rates for example 4 and comparative example 4.

Comparative Example 4 (not According to the Invention)

The total platinum loading was 0.58 mg/cm$^2$; this loading is virtually identical to that in example 4. As in example 4, a catalyst loaded with about 16% of Pt was used. In contrast to example 4, a symmetrical cell having 0.29 mg/cm$^2$ of Pt on the anode and 0.29 mg/cm$^2$ of Pt on the cathode was tested in the comparative example (symmetrical structure). Using this cell, from appr. 93% of the hydrogen could be separated off from the gas mixture under the experimental conditions described in "General test conditions (example 4)", i.e. significantly less than in example 4 (95%). FIG. 5 shows the hydrogen removal rates for example 4 and comparative example 4.

The following table 2 show example 4 and comparative example 4 to indicate the influence of the amount of catalytically active material on the side of the anode 7 and on the side of the cathode 11. At a comparable amount of Pt, higher hydrogen removal rates can be achieved when using unsymmetrical cells than when using symmetrical cells. Table 2 also shows that a significant cost reduction can be achieved when a smaller amount of catalytically active material is present on the side of the cathode 11 than on the side of the anode 7.

TABLE 2

| Example/Comparative example and cell design | Pt catalyst in total cell [mg/cm$^2$] | H$_2$ removal [%] | Pt in anode [mg/cm$^2$] | Pt in cathode [mg/cm$^2$] | Pt loading on carbon support [%] | Pt reduction * [%] |
|---|---|---|---|---|---|---|
| Example 1 (unsym.) | 0.68 | ≈95 | 0.43 | 0.25 | ≈16 | 66.0 |
| Comparative example 1 (sym.) | 0.58 | ≈93 | 0.29 | 0.29 | ≈16 | 71.0 |

* compared to a symmetrical cell having 2 mg/cm$^2$ of Pt (1 mg/cm$^2$ of Pt on each side).

Evaluation

FIG. 3 shows a graph depicting the removal of hydrogen when using the membrane-electrode assembly 1 as per example 4 (continuous line) and comparative example 4 (broken line) in a short-time test over appr. 6 hours of operation.

The unsymmetrical membrane-electrode assembly 1 as per example 4 showed a remarkably higher hydrogen removal rate (≈95%) than the symmetrical membrane-electrode assembly 1 as per comparative example 4 (≈93%) under identical experimental conditions, with the same catalyst (about 16% Pt loading) and comparable total amount of Pt.

Together with examples 1 to 3 example 4 shows that better hydrogen removal rate can be obtained by using the unsymmetrical membrane-electrode assembly 1 in different gas mixtures containing H$_2$ and impurities than by using a symmetrical membrane-electrode assembly with comparable or identical total platinum amount. In addition, the examples show that an unsymmetrical membrane-electrode assembly 1 is preferred with regard to the H$_2$ removal rates in comparison to a symmetrical membrane-electrode assembly 1 irrespective of the side of humidifying (cathode side 11 in examples 1 to 3, anode side 7 in example 4.

The invention claimed is:

1. A membrane-electrode assembly, comprising:
a gastight, selectively proton-conducting membrane which has a retentate side having an anode and a permeate side having a cathode;
a voltage source for generating a potential difference between the anode and the cathode;
an anode catalyst having a catalytically active material on the retentate side; and
a cathode catalyst having a catalytically active material on the permeate side,
wherein:
the anode is a gas diffusion electrode having a gas diffusion layer adjoining the proton-conducting membrane and a microporous layer applied thereto, on top of which the anode catalyst has been applied, and/or
the cathode is a gas diffusion electrode having a gas diffusion layer adjoining the proton-conducting membrane and a microporous layer applied thereto, on top of which the cathode catalyst has been applied; and
the cathode catalyst has a smaller amount of catalytically active material than the anode catalyst,
wherein the ratio of the amount of the catalytically active material of the cathode catalyst to the amount of the catalytically active material of the anode catalyst is from 1:1.75 to 1:3.0.

2. The membrane-electrode assembly according to claim 1, wherein the amount of the catalytically active material of the cathode catalyst is from 0.001 mg/cm$^2$ to 1.00 mg/cm$^2$, based on the total area of the cathode.

3. The membrane-electrode assembly according to claim 1, wherein the anode catalyst and/or the cathode catalyst has platinum as catalytically active material.

4. The membrane-electrode assembly according to claim 1, wherein the anode catalyst and the cathode catalyst have the same catalytically active material.

5. The membrane-electrode assembly according to claim 1, wherein the retentate side and/or the permeate side each have an active area of the membrane-electrode assembly which comprises the catalytically active material, where the active area is from 5 cm$^2$ to 20 000 cm$^2$.

6. The membrane-electrode assembly according to claim 1, wherein the gas diffusion layers comprise an electronically conductive and open-pored material.

7. The membrane-electrode assembly according to claim 1, wherein the gas diffusion layers and/or the microporous layers comprise carbon.

8. A reactor, comprising:
at least one apparatus for carrying out a chemical reaction in which a mixed product gas comprising hydrogen is formed; and
at least one membrane-electrode assembly according to claim 1,
wherein the membrane-electrode assembly is joined to the apparatus in such a way that at least part of the mixed product gas can be conveyed from the apparatus onto the retentate side of the membrane-electrode assembly.

9. A process for separating off hydrogen, the process comprising:
a) carrying out of a chemical reaction in which a mixed product gas comprising hydrogen is formed in the reactor according to claim 8;
b) feeding the mixed product gas to the retentate side of a membrane-electrode assembly; and (1)
c) electrochemically removing at least part of the hydrogen contained in the mixed product gas with the membrane-electrode assembly,
wherein at least part of the hydrogen is oxidized to protons over the anode catalyst on the retentate side of the membrane and the protons are, after traversing the membrane, reduced to hydrogen over the cathode catalyst on the permeate side.

10. The process according to claim 9, wherein the chemical reaction in step a) is a dehydroaromatization of $C_1$-$C_4$-alkanes.

11. The process according to claim 9, wherein at least 30% of the hydrogen contained in the mixed product gas is separated off from the mixed product gas.

12. The process according to claim 9, wherein the removal of the hydrogen occurs at temperatures of from 20° C. to 200° C.

13. The process according to claim 9, wherein the amount of the catalytically active material of the cathode catalyst is from 0.001 mg/cm$^2$ to 0.7 mg/cm$^2$, based on the total area of the cathode.

* * * * *